April 2, 1963 J. E. SAYERS 3,083,516
DUST SEPARATORS
Filed May 5, 1961

Inventor:
James Edmund Sayers
By Baldwin & Wright
Attorneys

United States Patent Office 3,083,516
Patented Apr. 2, 1963

3,083,516
DUST SEPARATORS
James Edmund Sayers, Glasgow, Scotland, assignor to James Howden & Company Limited, Glasgow, Scotland, a British company
Filed May 5, 1961, Ser. No. 108,119
Claims priority, application Great Britain July 18, 1960
7 Claims. (Cl. 55—338)

This invention relates to dust separators which are intended for use in handling a gas flow from which it is desired to separate dust at intermittent periods only.

Flow through a separator results in loss of pressure and the object of the invention is to devise a separator for use with a gas flow of the kind referred to in which, during any period when dust separation is not required, the gas is allowed to flow through the apparatus with minimum loss of pressure.

With this end in view, and according to the invention, a dust separator for handling a gas flow from which it is required to separate dust at intermittent periods only, will include a plurality of vanes which are disposed in the path of gas flow through the separator and are movable from a first to a second position and vice versa, the arrangement being such that when dust separation is to be effected, the vanes will be set in the first position wherein they will cause an abrupt change of direction in the flow of gas such as will cause separation of dust therefrom and resultant flow of substantially dust free gas through an outlet duct while when separation is not required said vanes will be set in the second position wherein they will serve to guide the gas flow to the outlet duct with a minimum loss of pressure.

Figure 1:
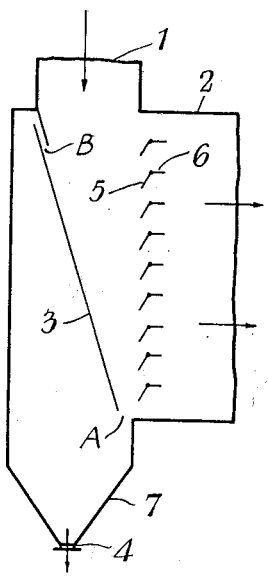
Figure 2:
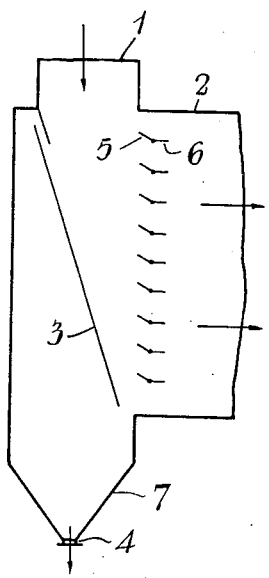

One form of separator in accordance with the invention is shown diagrammatically in the accompanying drawings in which FIGURE 1 is a sectional elevation with the vanes in the position for effecting dust separation and FIGURE 2 is a similar view with the vanes in the position for guiding the gas flow from the inlet to the exit of the separator.

Referring now to FIGURE 1 the separator casing is provided with an axial inlet 1 at its upper end, and an outlet duct 2, the axis of which is arranged transversely at right angles to the main axis of the separator. An inclined deflector plate 3 extends across the separator below the inlet in the path of the gas flow and is arranged to provide recirculation passages, as shown slots A and B. At the entrance to the outlet duct 2 there is provided, according to the invention, an arrangement of vanes which may be wholly or partly movable but which for the sake of example is shown to comprise movable vanes 5 and fixed vanes 6, spaced across the path of gas flow to provide passages for gas flow therebetween. Each of the movable vanes 5 is pivoted on a horizontal axis and joins a fixed vane 6. In the position shown in FIGURE 1 the movable vanes 5 have a downward inclination and the fixed vanes 6 lie parallel with the axis of the outlet duct 2 and point towards its exit end.

When the separator is required to remove dust it will be conditioned with the vanes 5 set in the position shown in FIGURE 1 so that the gas entering the collector and passing through the upstream vanes 5 will be subjected by reason of the setting of said vanes to an abrupt change in direction of flow. The change of direction of flow is effective to separate the dust particles from the gas so that only clean gas will flow through the passages between the vanes 5 and 6 and thence through the outlet duct. The dust particles continue to follow the same direction of flow as that in which they entered the separator and they will be deposited in a hopper 7, which is provided with an outlet 4 for discharging the collected dust. The flow of dust into the hopper is further assisted by a self-induced recirculating flow maintained by the difference in static pressure between points A and B at opposite ends of the plate 3. The part of the gas which passes with the solid particles through slot A into the hopper will rise through the body of the separator and re-enter the main gas flow near the inlet, through the slot B.

When dust separation is not required, the apparatus will be conditioned with the pivoted vanes 5 turned into the position shown in FIGURE 2. In that position vanes 5 have an upward inclination while of course the downstream vanes 6 which are fixed remain as before.

With the vanes set at the position shown in FIGURE 2, gas entering the inlet will be guided by the pivoted vanes 5 directly through the outlet duct 2 to the exit of the separator with minimum loss of pressure.

It may be pointed out here that while in the drawings the main axis of the separator is shown to be vertical the construction or arrangement of the apparatus may be such that said axis will be horizontal.

What I claim is:

1. A dust separator apparatus conditionable selectively for separating dust from gas flowing through said apparatus and for enabling flow of gas through said apparatus with less dust separation but with minimum loss of pressure, said apparatus comprising a casing having an inlet for flow of gas into said casing in one direction and an outlet for flow of gas from said casing in another direction transverse to said one direction; a plurality of first vanes spaced from one another across the path of gas flowing from said casing through said outlet and being generally parallel to said path; a plurality of second vanes spaced from one another across said path upstream of said first vanes and being adjustable to a first position wherein said second vanes will cause an abrupt change of direction of flow of gas from said casing to said first vanes and said outlet, thereby conditioning said apparatus for separating dust from the gas, and to a second position wherein said second vanes will guide the gas between said first vanes with a less abrupt change of direction, thereby conditioning said apparatus for enabling flow of gas therethrough with a minimum loss of pressure; and a plate within said casing inclined from one of its edges adjacent to said inlet and relatively far from said vanes to its opposite edge relatively far from said inlet and relatively close to said vanes.

2. A dust separator apparatus according to claim 1 including a dust discharge outlet beyond said opposite edge of said plate, the latter intervening between said inlet and said dust discharge outlet, said one edge and said opposite edge of said plate terminating short of said casing respectively adjacent to said inlet and said dust discharge outlet to provide gas recirculation passages.

3. A dust separator apparatus conditionable selectively for separating dust from gas flowing through said apparatus and for enabling flow of gas through said apparatus with less dust separation but with minimum loss of pressure, said apparatus comprising a casing having an inlet for flow of gas into said casing in one direction and an outlet for flow of gas from said casing in another direction transverse to said one direction; a plurality of first vanes spaced from one another across the path of gas flowing from said casing through said outlet and being generally parallel to said path; a plurality of second vanes spaced from one another across said path upstream of said first vanes and being adjustable to a first position wherein said second vanes will cause an abrupt change of direction of flow of gas from said casing to said first vanes and said outlet, thereby conditioning said apparatus for separating dust from the gas, and to a second position wherein said second vanes will guide the gas between said first vanes with a less abrupt change of direction, thereby conditioning said apparatus for enabling flow of gas therethrough with a minimum loss of pressure; and means to deflect the inlet flow of gas in a direction generally towards said second vanes.

4. A dust separator apparatus according to claim 3 in which said first vanes are fixed and said second vanes are adjustable relatively to said first vanes.

5. A dust separator apparatus according to claim 3 in which said second vanes respectively join said first vanes and are adjustable relatively to said first vanes to form different angles with said first vanes.

6. A dust separator apparatus according to claim 5 in which said second vanes are selectively adjustable to be inclined relatively from their respectively associated first vanes toward said inlet and to be inclined from their respectively associated first vanes away from said inlet.

7. A dust separator apparatus according to claim 5 in which said second vanes are pivoted where they join their respectively associated first vanes.

References Cited in the file of this patent
UNITED STATES PATENTS

| 2,066,832 | Gay | Jan. 5, 1937 |

FOREIGN PATENTS

| 119,075 | Sweden | Apr. 24, 1947 |
| 284,790 | Switzerland | Dec. 1, 1952 |